United States Patent [19]

Lotz

[11] Patent Number: 5,183,997
[45] Date of Patent: Feb. 2, 1993

[54] HEATING APPARATUS FOR COOKING FOOD, ESPECIALLY A HOT PLATE

[75] Inventor: Hans-Georg Lotz, Gründau, Fed. Rep. of Germany

[73] Assignee: Leybold Aktiengesellschaft, Hanau am Main, Fed. Rep. of Germany

[21] Appl. No.: 762,012

[22] PCT Filed: Mar. 21, 1989

[86] PCT No.: PCT/EP90/00428
§ 371 Date: Sep. 18, 1991
§ 102(e) Date: Sep. 18, 1991

[87] PCT Pub. No.: WO90/11671
PCT Pub. Date: Oct. 4, 1990

[30] Foreign Application Priority Data

Mar. 21, 1989 [DE] Fed. Rep. of Germany ........ 3909246

[51] Int. Cl.[5] ............................................. H05B 3/74
[52] U.S. Cl. .................................... 219/464; 219/465
[58] Field of Search ............... 219/443, 458, 459, 461, 219/462, 464, 465

[56] References Cited

U.S. PATENT DOCUMENTS

| | | | |
|---|---|---|---|
| 1,954,128 | 4/1934 | Heyroth | 219/464 |
| 2,601,011 | 6/1952 | Wilcox | 219/464 |
| 4,892,997 | 1/1990 | McWilliams | 219/461 |
| 4,902,876 | 2/1990 | Mewissen | 219/464 |
| 5,026,970 | 6/1991 | Buttery | 219/465 |

Primary Examiner—Teresa J. Walberg
Attorney, Agent, or Firm—Felfe & Lynch

[57] ABSTRACT

Heating apparatus which emits optical radiation having a visible content and an infrared content, for cooking foods by means of at least one radiation source (2) directed at a cook site for accommodating foods to be cooked or a container for foods to be cooked. Between the radiation source (2) and the cook site (4) there is a filter (7) having a support body (8) made of a material that is substantially permeable for all of the radiation. The support body (8) is provided with an interference layer system which reflects the visible content of the radiation at least predominantly to the radiation source and passes the infrared content of the radiation at least predominantly to the cook site. In order to achieve a simpler, firmly adherent layer build up with a small number of layers and without inner tensions, the interference layer system (9) consists of an alternating sequence of layers of silicon (H) and silicon dioxide of silicon (H) and silicon dioxide (N), whose physical layer thicknesses in the case of the silicon, at least in the predominant part of the silicon layers, are between 20 and 50 nanometers, and in the case of the $SiO_2$ are between 80 and 110 nm, at least in the predominant part of the $SiO_2$ layers.

12 Claims, 2 Drawing Sheets

HEATING APPARATUS FOR COOKING FOOD, ESPECIALLY A HOT PLATE

BACKGROUND OF THE INVENTION

The invention relates to a heating apparatus for cooking foods by means of at least one radiation source which is directed at a cook site for accommodating uncooked food or a container for food to be cooked, and which emits optical radiation with a visible content and an infrared content. Between the radiation source and the cook site a filter is disposed having a support body made of a material substantially transparent to all the radiation, which is provided with an interference layer system which reflects the visible content of the radiation at least predominantly back to the radiation source and passes the infrared content of the radiation at least predominantly to the cook site.

A heating apparatus of this kind, configured as a cook plate, is state of the art. In this apparatus what is involved is heating a cooker (cooking pot) placed on the cook plate with the infrared content of the optical radiation without letting the intensely visible part of the optical radiation penetrate into the kitchen space. The boundary here in question, between the visible and the infrared content of the optical radiation is at about 750 nm. The support body and interference layer system form a filter with a spectral transmission characteristic whose center lies at the above mentioned 750 nm.

Interference layer systems are characterized by alternating sequences of alternating layers of high refraction and low refraction. In the case of the system pertaining to the state of the art, titanium dioxide with an index of refraction of about 2.25 and silicon dioxide layers with an index of refraction of about 1.45 are used as the layer materials. In order then to obtain a sufficient division by the filter of a corresponding spectral transmission characteristic, it is necessary to apply a total of 43 alternating layers of the materials mentioned. This is a comparatively very difficult process which has to be performed in a vacuum, preferably by depositing the said layer materials by electron beam vapor deposition. Manufacture, therefore, is accordingly expensive.

The smaller the number of layer is, the better is their tension free build up and the firm bonding of these layers to the support body, the so called substrate, and to one another.

SUMMARY OF THE INVENTION

It is therefore the object of the invention to offer a heating apparatus of the kind described above, whose filter has a substantially simpler layered structure and gets by with a very much smaller number of individual layers, while the layer system at the same time is very largely free of internal tensions and has good adherence of the layers to one another and to the substrate (support body).

The solution of the stated problem is achieved in accordance with the invention in the heating apparatus described above by the fact that the interference layer system consists of an alternating sequence of layers of silicon and silicon dioxide, whose physical layer thicknesses in the case of silicon are between 20 and 50 nm in at least the predominant part of the Si layers, and between 80 and 110 nm in the case of the $SiO_2$, at least in the predominant part of the $SiO_2$ layers.

On the basis of the selection of the layer materials and the dimensions of the individual layers it is possible to make do with a very much smaller number of pairs of layers. With even only 5 layer pairs, i.e., a total of 10 individual layers, a quite outstanding filter characteristic is produced, as will be further explained with the aid of a transmission curve in the detailed description. The layer system according to the invention is very largely free of internal tensions.

The refractive index for silicon in the infrared range is approximately $n=3.5$; the refractive index for $SiO_2$ is $n=1.45$. The small number of individual layers, among other things, is to be attributed to this very great difference of the refractive indices. To this is added, however, the relatively very great absorption capacity of silicon for optical radiation in the visible range. A high refractive index on the one hand, and a relatively great absorptivity of silicon on the other, advantageously combine with one another.

Experiments have furthermore shown that the layer system according to the invention is superior to all of the filters tested thus far, as regards useful life, thermal stability and optical quality.

It is of special advantage to make the support body of a glass ceramic material transparent to infrared, a measure which pertains to the state of the art, and to equip this support body the so called substrate with an interference layer system according to the invention and use it as a cook plate. Also, it is again especially advantageous if the interference layer system is disposed on the bottom of the cook plate.

The filter in accordance with the invention, however, is not limited to use as a cook plate, i.e., for the direct placement of a cook pot on it. Instead it is also possible to use the filter according to the invention as the wall of a baking and broiling chamber and to direct the remaining infrared content of the optical radiation directly at the food being baked or broiled.

Furthermore, when the interference layer is used on the bottom surface of a cook plate, the latter is exposed to much less thermal stress than it would be if it were applied to the outside of a quartz lamp or to the surface of a tubular support body surrounding the quartz lamp.

The materials, "Neoceram black" of Nippon Electric Glass Company, "Corning Material 9632" of Corning Glass, or the glass ceramic materials "Robax" and "Ceran" of the Schott company in Mainz, Germany, can be used as materials for the support body of a cook plate. These are registered trademarks of the companies in question, but business is conducted under these names. The materials in question have the necessary high transmission in the infrared range and at the same time the necessary mechanical strength and chemical stability.

It is furthermore advantageous if the cook plate has several placement surfaces for cook pots and is provided with a masking element which is at least largely opaque to optical radiation and by which the surface areas transparent to infrared defining the placement surfaces within the cook plate are separated from surface areas opaque to radiation.

It is especially expedient for the areas transparent to infrared to be circular areas within the masking element, and they can best have a size and be graduated as regards their diameter in a manner similar to those of conventional mass cook plates.

A surface coating that is opaque to the entire range of the optical radiation can be used on the support body as the masking means; it is also possible, however, to apply to the bottom of the cook plate a metal plate provided with appropriately arranged openings serving to a certain extent to mask the radiation.

It is furthermore advantageous if the interference layer system has, as regards its spectral properties, such a spectral transmission characteristic that it is transparent for a portion of radiation in the visible red range.

In such a case, the cook plate has in the area of the placement surfaces for the cook pots, i.e., in the corresponding transparency range when the radiation source is operating, a certain warning function, i.e., the placement surface not occupied by a cook pot lights up like a glowing mass cook plate. This warning function protects the operator against, for example, laying his or her hands on the cook plate which otherwise appears to be cold, but one which nevertheless presents a danger of burning by the radiation.

A cook plate constructed according to the invention has the control properties of a gas stove: if the operator decides to increase or decrease the heat output, this is performed absolutely at will by the use of controls acting on the quartz lamp. In particular, the nuisance of "after boiling," which is encountered in mass cook plates, is completely avoided. In any case, only that amount of energy is converted to heat of vaporization which is stored in the bottom of the cook pot.

DETAILED DESCRIPTION OF THE PREFERRED EMBODIMENTS

Figure 1:
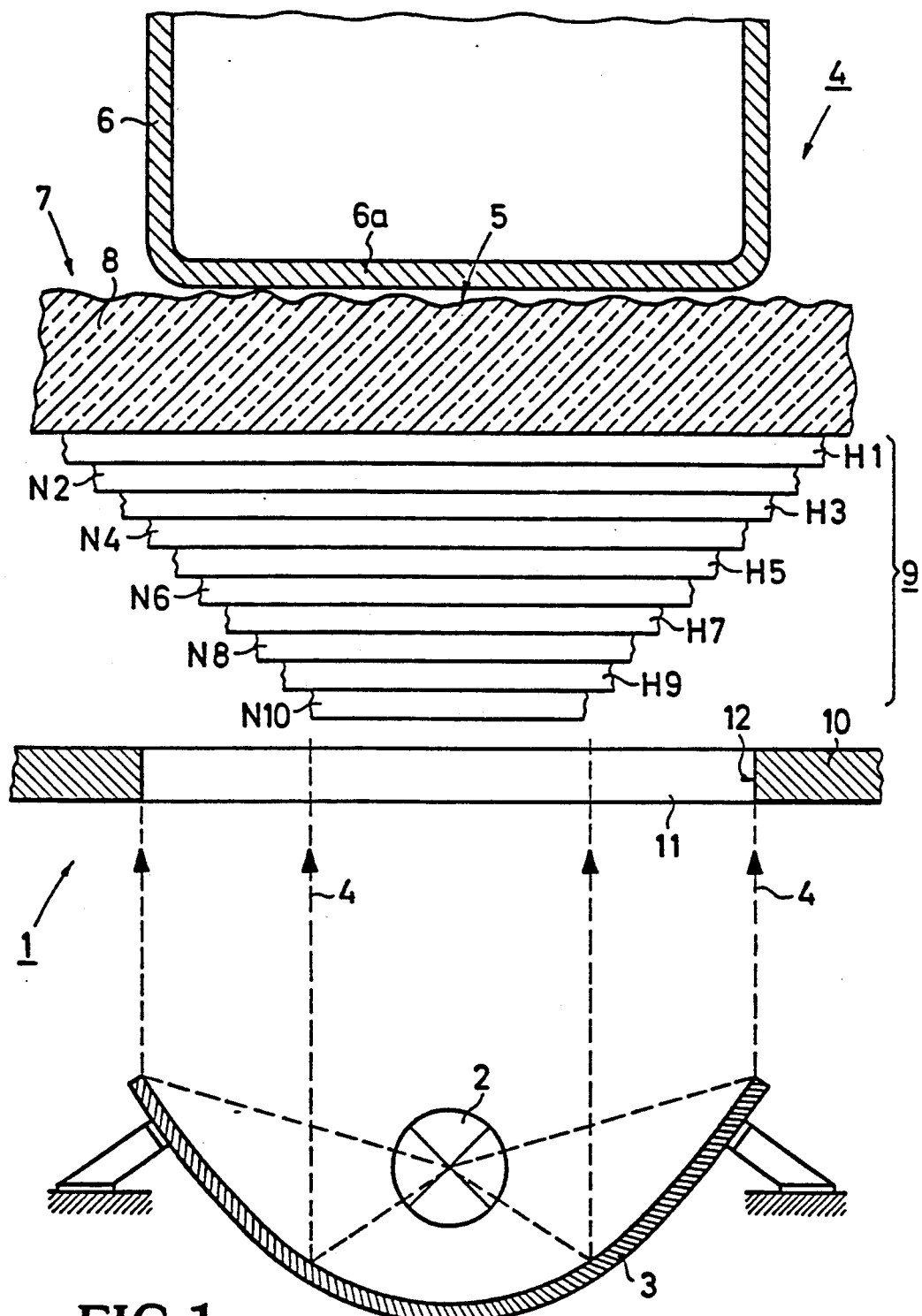
FIG. 1 shows a vertical section through a heating apparatus in accordance with the invention, wherein the thickness of the individual interference layers is greatly exaggerated.

In FIG. is depicted a heating apparatus which includes a radiation source 2 for the emission of optical radiation, a quartz lamp, for example, and a reflector 3, by which at least the infrared content of the optical radiation is reflected upwardly, insofar as possible, in the direction of the arrows 4.

Above the radiation source 2 there is formed a cooking site 4, which is defined essentially by the cross section of the beam of infrared radiation reaching this point. In the case of the embodiment shown in FIG. 1, the cooking site 4 coincides with the circular placement surface 5 of a cook pot 6, of which only the lower part near its bottom 6a is represented.

It is easily conceivable to omit the cook pot and suspend the food itself, such as a broiling chicken, on a rotating spit above the placement surface. The cook site 4 is in this case determined by the surface of the food.

Between the radiation source 2 and the cook site 4 there is a filter 7 which consists of a support body 8 and an interference layer system 9. The support body 8 consists of a material that is substantially transparent to all of the radiation, such as a glass ceramic material for example. For the materials available on the market, see the trademarks named above.

The interference layer system 9 consists of a total of 10 individual layers H1 to N10, the highly refractive layers being identified by the prefix H, and the low refractive layers by the prefix N. The layers thus alternate in the order H1 N2 H3 N4 . . . .

The individual layers have the optical and physical thicknesses given in the table below. As it appears from the table, the individual layers have a thickness corresponding to the quarter wavelength. Differences from these layer thicknesses are present substantially only in layers H1 and H9. These are so called adapter layers to flatten out the transmission curve.

The invention also relates to layer systems with a similar number of layers, e.g., 6 to 16, which have a dividing characteristic basically similar to the example shown. Layer systems with fewer than 10 layers lead to less steepness of the spectral transmission characteristic and to less blocking in the blocking range in question.

TABLE

| Layer number thickness | Layer material | Optical | Physical thickness |
|---|---|---|---|
| N 10 | $SiO_2 =$ | 688 nm | 119 nm |
| H 9 | $Si =$ | 134 nm | 10 nm |
| N 8 | $SiO_2 =$ | 540 nm | 93 nm |
| H 7 | $Si =$ | 540 nm | 39 nm |
| N 6 | $SiO_2 =$ | 540 nm | 93 nm |
| H 5 | $Si =$ | 540 nm | 39 nm |
| N 4 | $SiO_2 =$ | 540 nm | 93 nm |
| H 3 | $Si =$ | 540 nm | 39 nm |
| N 2 | $SiO_2 =$ | 534 nm | 92 nm |
| H 1 | $Si =$ | 331 nm | 24 nm |
| Substrate | | | |

The individual layers are shown greatly exaggerated as to their thickness in FIG. so as to make them visible in the figure.

The upwardly facing placement surface 8a of the support body 8 is provided with a texture so as to avoid full surface contact between the pot 6 and the support body 8 and insofar as possible to prevent it from overheating.

With the filter 7 in FIG. 1 a masking element 10 is associated, which consists of a punched sheet metal plate having one or more circular openings 11. The circumference of the opening 11 corresponds substantially to the circumference of the reflector 3, which is also disposed in alignment with the opening. In this manner a relatively sharply defined light beam is created, which defines a similarly sharply defined placement surface 5 8a on the upper side of the support body 8.

If a heating apparatus has several radiation sources 2 with reflectors 3 below one and the same support body 8, the masking element 10 also has several correspondingly large circular openings. Thus a number of infrared transparent surface areas are defined which define the placement surfaces and are bordered by opaque surface areas. The boundary lines are formed by the edges 12 of the openings 11.

As has been explained above, the masking element 10 does not have to be made as a separate component; it is entirely possible to provide the masking element as a surface coating, for example, and place it on the interference layer system 9.

EXAMPLE

In a Model A 1100 Q vacuum coating apparatus (manufacturer: Leybold AG, Hanau, Federal Republic of Germany) a series of a total of 10 individual layers listed in the Table and shown in FIG. 1 was produced on circular support bodies (substrates) made of "Robax." The flat substrates had a diameter of 170 mm and a thickness of 3 mm, and were placed in a cup shaped substrate mount which rotated above vapor sources of silicon and silicon dioxide at a distance of about 50 cm. The substrates were heated before and during the coating to a temperature of 300° C. 2 electron beam guns Model ESV 14 (manufacturer: Leybold AG) served for heating the vapor sources. By the alternating vaporization of silicon on the one hand and silicon dioxide on the other the desired sequence of the coatings was produced.

At the beginning the vapor depositing apparatus was evacuated within 30 minutes to a pressure of $5 \times 10^4$ Pa. After a heating time of one hour the substrates were pretreated in a glow discharge in an argon atmosphere at a pressure of 5 Pa for 10 minutes. Then the layers of Si and $SiO_2$ were deposited from the vapors as described above, in the layer thicknesses given in the table. During the application of the layers of $SiO_2$ the vaporizing atmosphere was brought to an oxygen partial pressure of $2 \times 10^2$ Pa by feeding oxygen.

The layers were built up and the vapor sources were monitored by means of an optical device for measuring coating thicknesses.

Figure 2:
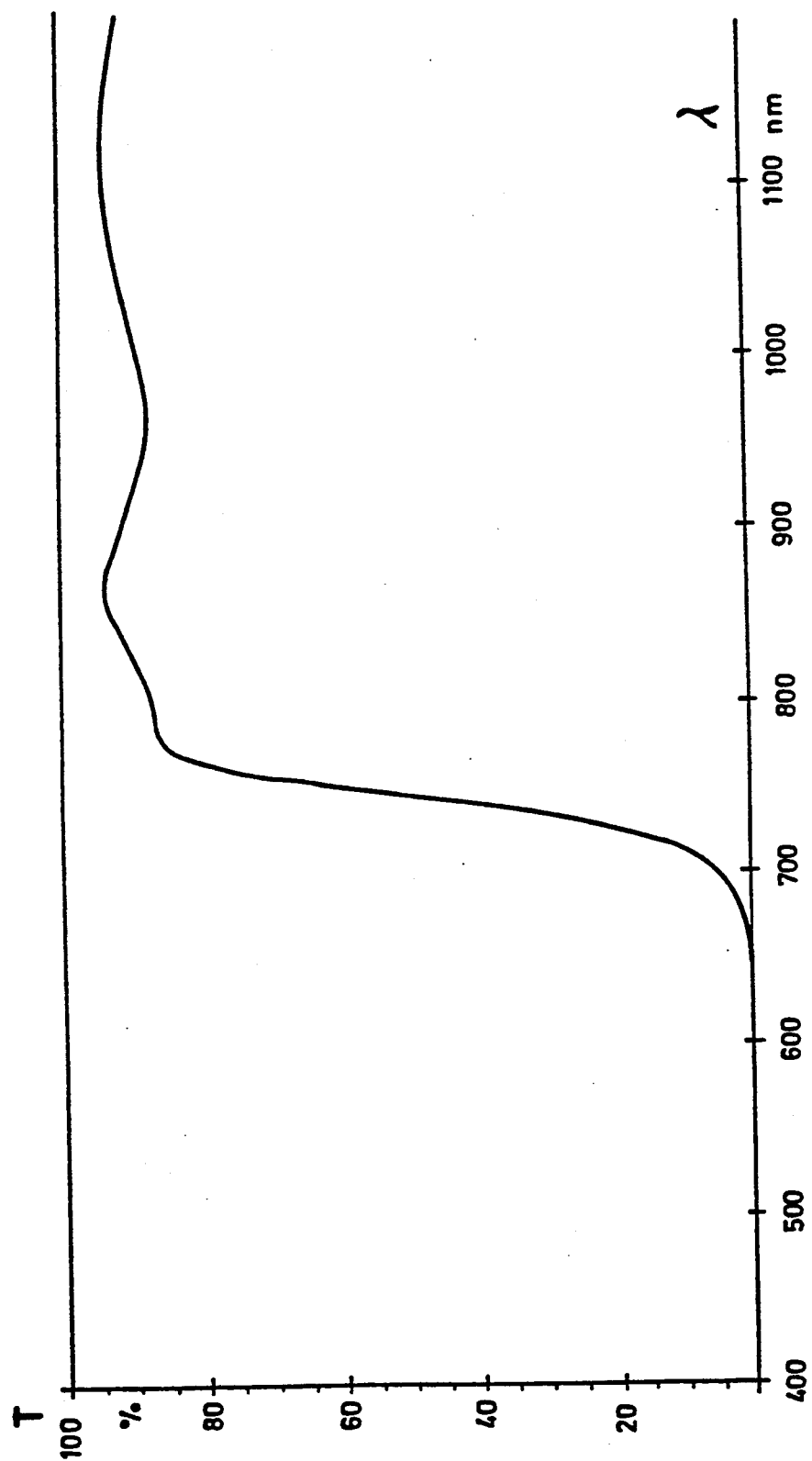
FIG. 2 is a graph in which the transmission of the interference layer system of FIG. is plotted against the wavelength.

After completion the substrates thus coated were measured in an optical measuring device Model Lambda 9 (manufacturer: Perkin Elmer). The transmission curve thus plotted is represented in FIG. 2. It shows that the filters have a transmission in the spectral range above 780 nm whose maximum exceeds 90%, while at the same time the transmission below a wavelength of 680 nm was less than 2%.

Mechanical and chemical testing of the filters as regards useful life, thermal stability, and thermal shock resistance led to very good results.

I claim:

1. Heating apparatus for cooking foods comprising at least one radiation source directed at a cook site for accommodating food to be cooked or a container for food to be cooked, said source emitting optical radiation with a visible content and an infrared content, a filter with a support body made of a material substantially transparent to the radiation, said filter being disposed between the radiation source and the cook site and provided with an interference layer system which reflects the visible content of the radiation at least predominantly to the radiation source and passes the infrared content of the radiation at least predominantly to the cook site, wherein the interference layer system comprises an alternating series of layers of silicon (H) and silicon dioxide (N) whose physical layer thicknesses in the case of the silicon is between 20 and 50 nm, and in the case of the $SiO_2$ between 80 and 110 nm.

2. Heating apparatus according to claim 1, wherein at least three layer pairs H/N are provided.

3. Heating apparatus according to claim 2, wherein five layer pairs H/N are provided.

4. Heating apparatus according to claim 3, wherein the physical layer thicknesses from the first to the tenth layer N10 are chosen as follows: H1=24 nm, N2=92 nm, H3=39 nm, N4=93 nm, H5=39 nm, H6=93 nm, H7=93 nm, N8=93 nm, H9=10 nm, N10=119 nm.

5. Heating apparatus according to claim 2, wherein the layer sequence, starting from the support body (8), begins with a layer of Si.

6. Heating apparatus according to claim 2, wherein the layer sequence ends with a layer of $SiO_2$.

7. Heating apparatus according to claim 1, wherein the support body consists of an infrared transmitting glass ceramic material and is configured with the interference layer system as a hot plate.

8. Heating apparatus according to claim 7, wherein the support body has a bottom on which the interference layer system (9) is disposed.

9. Heating apparatus according to claim 7, wherein the hot plate has a plurality of placement surfaces for cooking containers and is provided with a masking element at least largely opaque to optical radiation, by which infrared transmitting surface areas defining the placement surfaces within the hot plate are distinguished from radiation opaque surface areas.

10. Heating apparatus according to claim 9, wherein the infrared transmitting surface areas are disposed as circular openings within the masking element.

11. Heating apparatus according to claim 1, wherein, the interference layer system has such a spectral transmission characteristic that said system is transparent to a portion of the radiation in the visible red range.

12. Heating apparatus according to claim 1, wherein the interference layer system has a transmittance range for the infrared radiation which begins at a wavelength of 750 nm.

* * * * *